No. 774,189. PATENTED NOV. 8, 1904.
W. J. LAUGHLIN.
SPLIT LINK FOR CHAINS.
APPLICATION FILED MAR. 14, 1904.
NO MODEL.
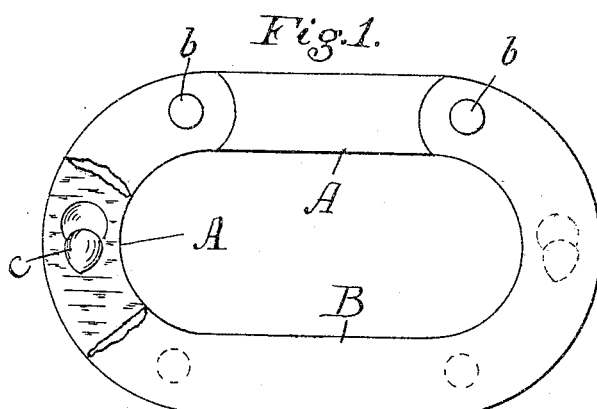
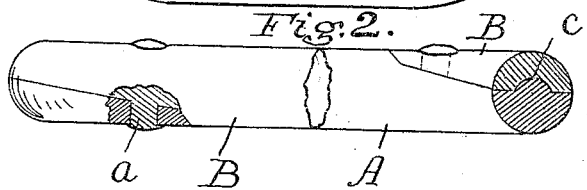
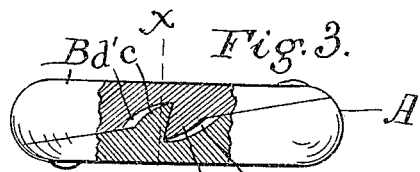
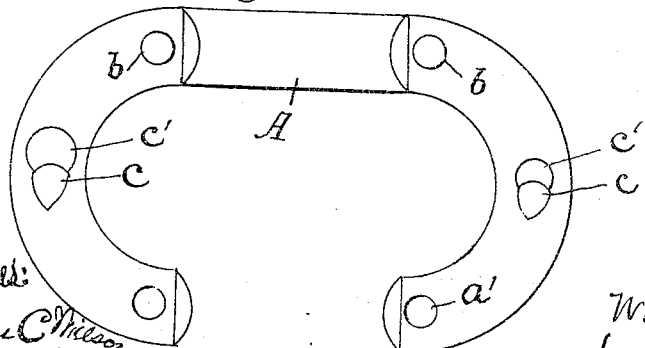
Witnesses:
Inventor
Walter J. Laughlin No. 774,189. Patented November 8, 1904.

UNITED STATES PATENT OFFICE.

WALTER J. LAUGHLIN, OF PORTLAND, MAINE.

SPLIT LINK FOR CHAINS.

SPECIFICATION forming part of Letters Patent No. 774,189, dated November 8, 1904.

Application filed March 14, 1904. Serial No. 198,126. (No model.)

*To all whom it may concern:*

Be it known that I, WALTER J. LAUGHLIN, a citizen of the United States of America, and a resident of Portland, Cumberland county, State of Maine, have invented certain new and useful Improvements in Split Links for Chains, of which the following is a specification.

My invention relates to a split link adapted to be made in two halves and riveted together; and the object of the invention is to make such a link with the strongest possible construction. These links have commonly been made in two similar parts, each of which has one solid side and two split or half ends provided with holes and rivets by which they were fastened together after they were inserted in the chain. When a strain was put on these links, the tendency was to shear off the rivets and straighten the ends, causing the two half ends to shear by each other in the direction of the axis of the link. To prevent this, I form on each of the parts in the center of the end a projection which interlocks with a corresponding projection on the other part, with opposing and bearing surfaces, which are substantially at right angles to the axis of the link and which consequently resist the tendency of the link to straighten at the ends and of the two half ends to shear by each other. Such a construction takes the strain from the rivets, and the rivets, on the other hand, holding the projections in close locking contact utilize their full strength.

I illustrate my invention by means of the accompanying drawings, in which—

Figure 1 is a plan of the link when fastened together with a portion of one end of the upper half cut away. Fig. 2 is an edge view of the same with one end in section on the line $x$ $x$ of Fig. 3. Fig. 3 is an end elevation with a part in central section, and Fig. 4 is a plan of one part.

A and B are the two parts, and they are preferably made just alike, with one solid side and tapering split ends, in the well-known manner. The split ends are provided with interlocking holes $a'$ and rivets $b$ and $a$, by which the two parts of the link are riveted together.

In order to take the strain from the rivets and prevent the ends from straightening, I form on each part at the center of each end a projection which interlocks with an opposing projection on the opposite part.

As here shown, the projection $c$ is formed on the part A, and it is in the form of a rounded tooth with a face substantially at right angles to the axis of the link, this face being in contact with the corresponding face of the projection $d$ on the opposite part. These faces are, as here shown, slightly inclined, so that a pull in the direction of the axis of the link will draw them closer together, and they each have a recess $c'$ and $d'$ at their base to admit the other projection. It is obvious that these projections may be in a variety of forms as long as they oppose faces which resist a longitudinal stress of the two parts to slide or shear on each other.

A link constructed on this plan is very strong, easily put together, and adapted to be made by the drop-forging process.

While I have shown the abutting surfaces of the projections $d$ as being slightly inclined inward, so that a pull would tend to draw them together, this form of construction is not adapted to drop-forged work in which it is necessary to have the surfaces slightly inclined in the other direction, so that a pull would tend to separate them. As the drop-forging process is the one used for making merchantable links, the form last indicated would be the one ordinarily used. It thus becomes important to have the two halves of the link fastened together, as the first effect of the pull has a tendency to separate the two halves. By using rivets, as here shown, the two halves are held firmly together and are also held from shearing by each other.

I claim—

The herein-described split link composed of two parts each of which has one solid side and split ends with rivets and holes at or near the points where the ends join the sides for riveting the two parts together, the center of each end being provided with a projection which interlocks with a corresponding projection on the opposite part with opposing surfaces substantially at right angles to the axis of the link to prevent the ends from spreading.

Signed at Portland, Maine, this 29th day of February, 1904.

WALTER J. LAUGHLIN.

Witnesses:
S. W. BATES,
L. W. GODFREY.